United States Patent [19]

Languillat

[11] Patent Number: 4,748,880

[45] Date of Patent: Jun. 7, 1988

[54] PROCESS AND APPARATUS FOR TRUNCATING TUBES

[75] Inventor: Jean-Paul Languillat, Vallieres Par Thorigny Sur Oreuse, France

[73] Assignee: Lhomme S.A., Pont sur Yonne, France

[21] Appl. No.: 859,404

[22] Filed: May 5, 1986

[30] Foreign Application Priority Data

May 6, 1985 [FR] France ................ 85 06867

[51] Int. Cl.⁴ .................. B26D 3/16; B26D 5/04; B26D 5/12; B23B 7/00

[52] U.S. Cl. ......................................... 82/48; 82/87; 82/92; 82/100; 83/54; 83/187; 83/554

[58] Field of Search ............... 82/46, 47, 48, 83, 86, 82/87, 89, 90, 91, 92, 93, 100; 83/54, 187, 554

[56] References Cited

U.S. PATENT DOCUMENTS

| | | | |
|---|---|---|---|
| 1,006,574 | 10/1911 | Lorenz | 82/86 |
| 1,457,992 | 6/1923 | Morrison | 82/86 |
| 2,109,786 | 3/1938 | Taft | 82/86 |
| 3,083,601 | 4/1963 | Leiss et al. | 82/48 |
| 3,161,097 | 12/1964 | Judelson | 82/86 |
| 3,451,295 | 6/1969 | Shallenberg | 82/86 |
| 3,861,253 | 1/1975 | Witcraft et al. | 82/48 |
| 4,347,770 | 9/1982 | Mosey | 82/90 |
| 4,512,224 | 4/1985 | Terauchi | 82/100 |

FOREIGN PATENT DOCUMENTS

| | | | |
|---|---|---|---|
| 2164382 | 2/1973 | France . | |
| 902542 | 8/1962 | United Kingdom | 83/554 |
| 912491 | 3/1982 | U.S.S.R. | 82/86 |

*Primary Examiner*—Frederick R. Schmidt
*Assistant Examiner*—William E. Terrell
*Attorney, Agent, or Firm*—Sandler & Greenblum

[57] ABSTRACT

The invention relates to a process and apparatus for truncating tubes by means of a knife activated by a jack. The knife is mounted on a knife carrier pivotable on a base by one of the ends of a jack the other end of which is journalled on a lever similarly pivotable on the base and which rests in part on an elastic abutment adapted to pivot the lever towards the tube to be cut after having been compressed by the lever during a pivoting of the lever in a direction opposite to the tube and after an interruption of the extension of the jack, with a stop being provided to limit the extent of pivoting of the lever in the direction opposite of the tube to be cut.

10 Claims, 2 Drawing Sheets

PROCESS AND APPARATUS FOR TRUNCATING TUBES

BACKGROUND OF THE INVENTION

1. Field of the Invention

The invention relates to a process and apparatus for truncating tubes and more particularly, but not exclusively, tubes made of cardboard or plastic.

2. Discussion of Background and Material Information

The truncation of tubes made of cardboard or other materials is conventionally accomplished by means of a saw or with one or more knives. Typically a knife-blade arrangement is preferred for materials which are not too hard because knives normally result with cleaner cuts.

Tubes of this type are generally rotated on a mandrel adjacent at least one knife which is activated by a jack adapted to bring the knife towards the tube and to cause the blade of the knife to penetrate into the wall of the tube. Generally, the knife cuts entirely through the wall of the tube until it meets a counter portion, stop, or a harder counter knife at which point the direction of the knife is reversed. The counter can, for example, be formed by the mandrel itself or be separately provided as an attachment to a portion thereof. As one would expect, the counter or hard surface against which the knife contacts causes wear of the knife blade which eventually becomes dull.

In order to overcome this disadvantage, the present invention has attempted to reduce the pressure exerted by the knife at the moment when the knife comes into contact with the counter. As one will appreciate, it is very difficult to accurately adjust a jack or other hydraulic or pneumatic device to exert an appropriate and precise pressure on the knife in the course of the cut so as to reduce the pressure or force exerted on the knife at the end of the cut when the blade is about to contact the counter. The novel and unique apparatus of the present invention, however, effectively overcomes these disadvantages by interrupting the force initially applied to the knife, for example by a jack or similar mechanical, hydraulic or pneumatic device, as the knife cuts into but before the blade penetrates through the tube, while activating a means for exerting supplemental pressure on the knife, which is less than the force initially applied by the knife, until the cut is complete.

SUMMARY OF THE INVENTION

The present invention is directed to a process for truncating an elongate tube which involves subjecting a cutting device to an initial predetermined pressure sufficient to bring the cutting device from an initial position into contact with the tube; and exerting another lesser predetermined pressure against the cutting device to maintain the cutting device in contact with the tube until the completion of truncating. The process also involves sensing the completion of truncating and returning the cutting device to its initial position.

The present invention is also directed to an apparatus for truncating an elongate tube which includes a cutting device attached to a support in a position adjacent the tube, a first means for exerting a predetermined pressure in a direction against the support so as to bring the cutting device into contact with the tube, and a second means for exerting a lesser predetermined pressure in a direction against the support so as to maintain the means for cutting in contact with the tube until truncating is completed. Preferably the apparatus also inclues means for verifying the position of the means for cutting operably associated with the support, such as a switch to control the direction of the predetermined pressure exerted by the first means. The first means for exerting a predetermined pressure is preferably a jack which is operably associated with the second means for exerting a lesser predetermined pressure. In this case, the support is moveably mounted on a base and the jack is journalled at one end to a lever pivotably connected to the base and in contact with the second means for exerting a lesser predetermined pressure, such as an elastic abutment for the lever which is provided in the base.

The present invention is still further directed to an apparatus for truncating an elongate tube wherein the apparatus includes a base having an upper surface, a forward end positioned laterally adjacent the tube, and a rearward end equipped with an elastic abutment adapted to protrude above the upper surface; a generally elongate support having a first end journalled at the forward end of the base and a second end connected to a means for truncating the tube; a generally elongate lever having a first end portion journalled to the base at a location behind the forward end and having a rearward extension in contact with the abutment; and a jack having one end journalled to the second end of the support and another end journalled to a second end portion of said elongate lever.

In one embodiment of the present invention, the rearward extension of the lever is preferably provided with an adjustable stop adapted to impinge on the upper surface of the base. The elastic abutment is preferably a spring, or other means for biasing, covered by a cap positioned in a cavity provided in the rearward end of the base.

Another embodiment of the present invention provides the lever with a forward extension which is biased against the upper surface of the base by force generated by the spring which is transferred to the rearward extension of the lever so as to cause the lever to pivot towards the forward end of the base.

In another embodiment of the invention, the support is provided with a rearward extension adapted to contact means for verifying the position of the support operably associated with the support, which may include a switch for controlling movement of said jack, which is preferably a micro-contact.

The advantages of the present invention are realized by setting the jack at a predetermined pressure so as to cause the support to pivot towards the forward end of the base in such a manner that the knife exerts a constant pressure against the tube. The pressure exerted by the elastic abutment against the rear extension of the lever to which the end of the jack opposite the knife is journalled, however, is less than the pressure exerted when the knife contacts the tube. Consequently, the lever pivots rearwardly until its rearward extension, or stop provided thereon, contacts the upper surface of the base which arrests the possibility for further movement.

BRIEF DESCRIPTION OF THE DRAWINGS

The invention will be better understood and other details will appear from the description which follows with reference to the annexed drawings in which:

FIGS. 2 and 3 schematically illustrate side views of the apparatus during cutting of the tube.

DESCRIPTION OF THE PREFERRED EMBODIMENTS

Figure 1:
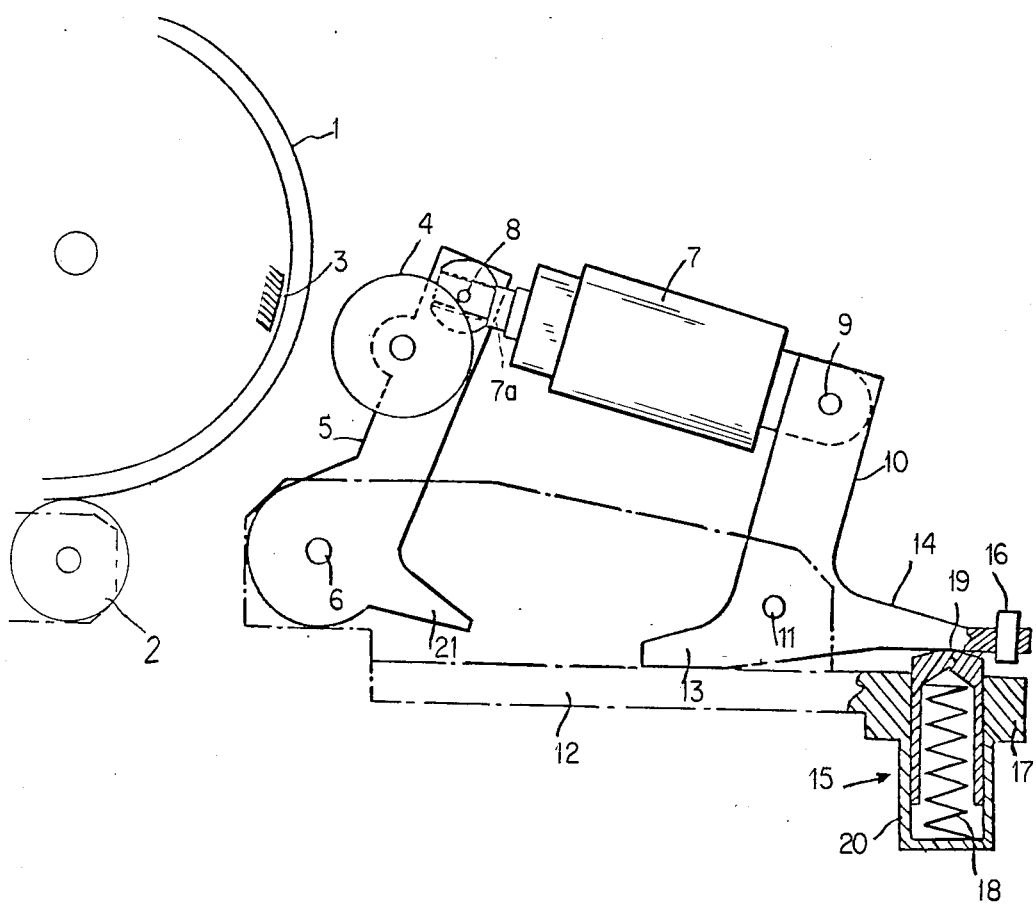
FIGS. 1–3 schematically illustrate side views of the apparatus according to the invention in different positions.

To achieve the above-mentioned goals, the inventor has discovered a novel process which is unique in that it involves blocking or otherwise interrupting the action of the jack before the completion of each tube truncation and actuating a means other than the jack as a supplemental means to activate the knife until the cut of each tube portion is completed. Accordingly, the force which is transmitted to the cutting edge of the knife by the supplemental means during this stage of the cutting procedure is less than that transmitted by the jack as the knife initially comes into contact with the exterior surface of the tube.

The apparatus of the present invention designed to achieve these advantages is novel and unique in that it includes a means other than the jack as a supplemental means for activating the knife, with the supplemental means being brought into action at essentially the same time as the action of the jack is interrupted to transmit a lesser force to the active portion of the knife than that transmitted by the jack.

Although the present invention is particularly advantageous in those instances where the cutting knife is likely to encounter a hard surface after penetrating through the surface to be cut, the process and apparatus of the present invention is also very advantageous in any cutting operation because in either case it is normally quite a difficult and delicate operation to obtain a clean cut completely through the tube and particularly at the beginning and end operation of the cutting operation.

According to one embodiment, the supplemental means for activating the knife is an elastic or resilient means for biasing which is adapted in a manner so as to free itself immediately upon blockage or interruption of the action of the jack so as to activate the knife by the pressure or force it exerts against the rear extension of the lever with which the knife is associated via the linkage between the knife support, the jack and the lever. In this case, the knife is preferably mounted on a knife carrier or support which is pivotably mounted on a base and whose pivoting is caused at least in part by one of the ends of a jack the other end of which is journalled on a lever similarly pivotably mounted on the support. A rearward extension of this lever rests on the elastic abutment which is adapted to cause the lever to pivot towards the tube. A means may also be provided for limiting the extent of pivoting of the lever in the direction opposite the tube to be truncated in the form of a stop which may be adjustably mounted to the rear extension of the lever so as to come to rest on the upper surface of the base for the cutter assembly after a certain compression of the elastic or resilient means.

The elastic abutment can be loaded so as to permanently bias the lever in a pivoting direction towards the tube. In the embodiment where the lever is provided with a forward extension, the elastic means biases the lever so that the forward extension comes to rest in a position which corresponds to a maximum pivoting of the lever towards the tube. The reverse pivoting of the lever in the opposite direction causes the compression of the elastic abutment due to a resistance moment exerted by the tube at the beginning of the cut. The elastic means can be formed by a spring or similar device positioned in an opening or cavity in the base which is provided with a pressure head or cap which emerges or protrudes from the opening above the upper surface of the base. The spring may be replaced, or supplemented, by an hydraulic or pneumatic jack having substantially constant pressure.

The apparatus of the present invention may also be provided with a means for verifying the position of the knife carrier or support to control the activation of the jack. Accordingly, the knife can be returned to its initial position by reversing the direction of the jack. The means for verifying, for example, may be a micro-contact, preferably provided with a position adjustment, which is activated by an element attached to or integral with the knife carrier or support as an extension thereof.

Figure 3:
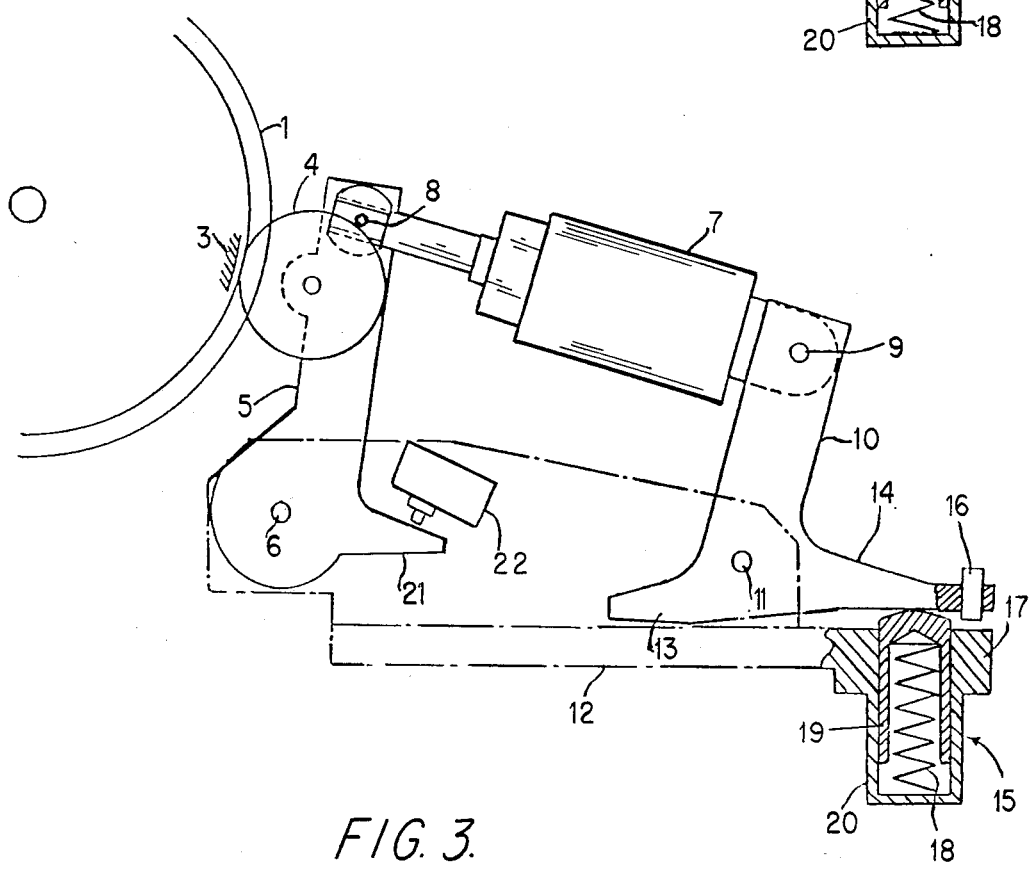

The invention also includes other features appearing in the following description and referring to the annexed drawings. FIGS. 1 and 3 of these drawings show a truncating apparatus according to the invention in different positions.

Referring to the drawings, a tube 1 to be cut may be mounted on a mandrel (not shown) for rotation by rollers 2 adjustably positioned laterally adjacent the longitudinal axis of the tube to guide the tube in its axial passage by conventional means, such as expansion jaws.

A relatively hard counter portion, schematically shown in FIG. 1 as element as 3, may be fixed or rotatably mounted within the interior of the tube. Alternatively, the counter may also be provided on the exterior surface of the interior mandrel.

The truncation apparatus of the present invention includes a knife 4 shows as a circular blade which may be fixed or adapted for rotation about an axis either freely or due to action of a motor with which it is operably connected. As shown, knife 4 is mounted on a knife carrier or support 5 which pivots around an axis 6 which is fixed or otherwise atached to base 12. The pivoting action is effected by a reciprocaly moving hydraulic, mechanical or pneumatic jack 7. The shaft 7a of jack 7 is journalled on axle 8 to one of the ends of the knife support 5, while the other end of jack 7 is journalled at axle 9 to a lever 10. In turn, lever 10 is similarly journalled around axis 11 which is fixed or otherwise attached to base 12. Typically the base 12 is fixed with respect to the longitudinal axis of the tube but it can be adapted to move longitudinally along the path of the tube. The actual arrangement of jack 7 can be reversed to present its shaft 7a towards lever 10.

Figure 2:
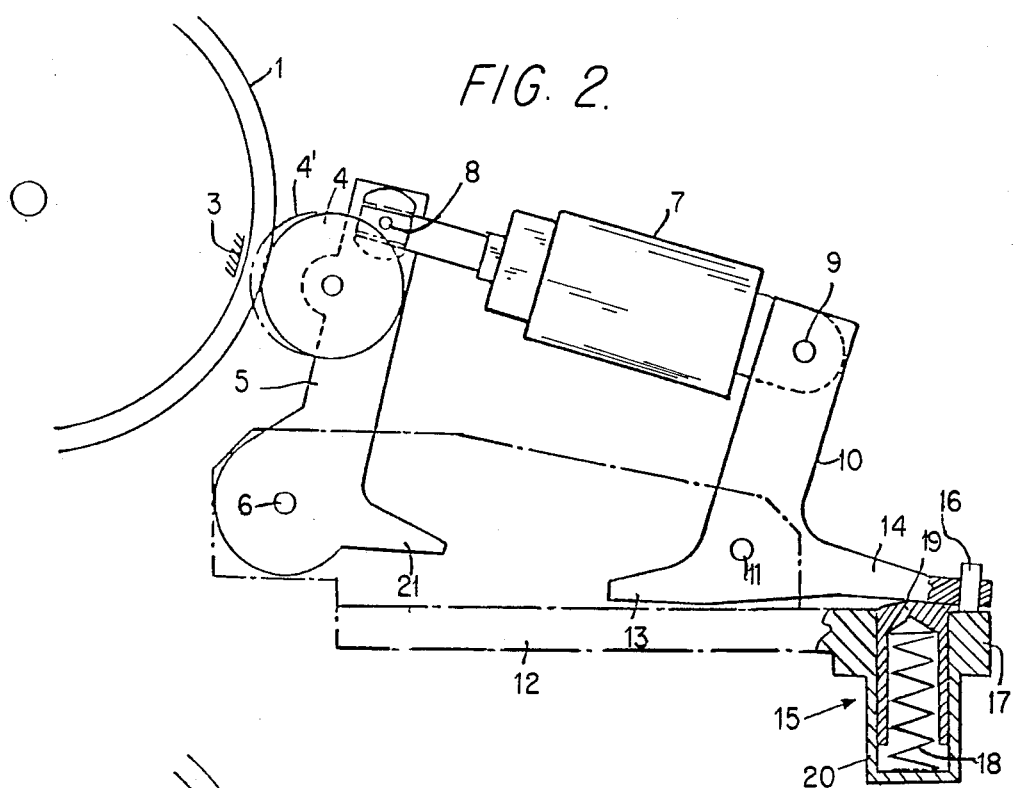

As shown, lever 10 has substantially the form of an inverted T, the cross-bar of which extends from one side to the other of axis 11 to form the front extension 13 and the rear extension 14 of lever 10. As shown in FIG. 1, the rear extension 14 rests on an elastic or resilient abutment 15 or means for biasing against extension 14 and the front extension 13 rests on the upper surface of base 12. An adjustable stop 16, preferably provided with a screw-type means for adjustment, is adapted to rest, as explained below in more detail with respect to FIG. 2, on a rear portion 17 of base 12. The elastic abutment 15 as shown includes a spring 18 or other means for biasing which is capped by a pressure head or cap 19. The spring and the pressure cap are positioned in an opening of cavity 20 provided in base 12. The spring has a certain tension so that its bias pivots the lever 10 in a forward direction towards the tube causing the extension 13 to rest on the base 12 in the position shown in FIG. 1, which represents the apparatus in the initial state. One can readily appreciate that the elastic abutment 15 can of course be replaced by any other means for biasing, for example which may be mechanical, hydraulic or pneumatic. An important capability that the abutment must possess, however, is that the means for biasing be adjustable to a certain pressure, so that the force transmitted on the active portion of the knife, i.e., the cutting edge of the blade, by the elastic abutment is less than that transmitted by jack 7. In this position, it will be noted that the stop 16 is adjusted so as not to rest on portion 17 of the support.

In the first position, jack 7 is activated, to cause the knife support 5 to pivot towards the tube. As the knife 4 touches the surface of the tube, the cutting edge of the blade begins to penetrate into the wall the tube. At the beginning of the penetration of the blade, the resistance moment exerted by the tube is greater than the pressure exerted by the pivoting movement of lever 10 urged towards the tube by elastic abutment 15 so that lever 10 pivots away from the tube in a direction towards the rear of the support. As this occurs the extension 13 lifts from base 12 and the extension 14 compresses spring 18 until the stop 16 comes into contact with the rear portion 17 of the base 12, as shown more clearly in FIG. 2. In this position, jack 7 is actually bolstered from rear portion 17 via stop 16 adjustably connected to rear extension 14 of lever 10 to which jack 7 is pivotably mounted. Consequently, once stop 16 comes into contact with rear extension 17 of the support, jack 7 can resume its expansion towards the tube and the knife continues its penetration into wall of the tube until it reaches the position shown as 4' in FIG. 2. In this position, the jack is blocked from further forward movement by any suitable means 22. As shown in FIG. 3, support 5 is provided with a rear extension 21 and the means for blocking 22 is positioned in operable association with the cutter assembly so as to be contacted by extension 21 when support 5 has pivoted towards tube 1 to the desired extent. The pivoting action of support 5 may be controlled electronically by using micro-contact switches or computer programming, or simply by length of the means for blocking itself.

As soon as the movement of the shaft of jack 7 is interrupted and the resistance moment against the knife dissipates, the spring 18 of the elastic abutment 15 causes the lever 10 to pivot in a forward direction which allows the knife 4 to finish the cut by exerting a pressure on the tube which is less than that which would have been exerted by the force of action of the jack. The position of the cutter assembly at the end of the cut is shown in FIG. 3, with the knife 4 being permitted to extend through the tube until reaching the hard counter portion 3.

As previously mentioned, in the embodiment shown in FIG. 3, the knife carrier 5 includes a rear extension or nose 21 which is shown as activating a micro-contact 22. The micro-contact 22 is preferably adjustable in position, particularly to take into account the wear on the knife, and is adapted in a manner so as to control the operations which follow after the cut of the tube piece is completed. Accordingly, the micro-contact 22 is activated by means of an extension 21 of knife carrier 5 which is operably associated or integral with knife 4 or at least integral with its axis of rotation in such a way that makes it possible to verify perfectly the exact position of the knife. This is in contrast to other known apparatus in which the position of the knife is verified by the position of a carrying element of the knife, such as a carriage. In accordance with this embodiment of the present invention, the activation of the micro-contact 22 will control the action of jack 7 to reverse its direction and return the knife support 5 to its initial position shown in FIG. 1, a position precisely the same as before because the extension 13 again comes to rest on support 12 under the action of elastic abutment 15. The adjustment of the position of the micro-contact 22 also makes it possible to limit the duration of contact of knife 4 on counter 3 and/or the value of the pressure exerted by the knife. In addition, it is also possible to activate the micro-contact slightly before the knife touches the coutner portion 3, with the knife finishing the cut by the inertia of the elements or by virtue of a time delay of the return of jack 7. When the apparatus returns to its initial position as shown in FIG. 1, it is ready to perform a new cut.

The invention relates to the truncation of a tube and the apparatus described can be provided in a truncation station of unitary tubes in which case the tube 1 is fixed in its longitudinal position while the base 12 can be fixed or adjusted longitudinally with respect to the tube. Alternatively, the apparatus according to the present invention can be used in conjunction with a continuous tube fabrication machine, in which case the base 12 would be adapted to be moveable so as to follow the progressive advance of the tube in the course of its manufacture. Also, the present invention provides for an assembly having a plurality of knives of this type or having one or more knives with a plurality of other complimentary cutting means such as wheel saws.

From the foregoing description, one skilled in the art can easily ascertain the essential characteristics of this invention and, without departing from the spirit and scope thereof, can make various changes and modifications of the invention to adapt it to various usages and conditions. Accordingly, although the invention has been described with reference to particular means, materials and embodiments, it is to be understood that the invention is not limited to the particulars disclosed and extends to all equivalents within the scope of the claims.

I claim:

1. In an apparatus for truncating an elongate tube, a tool comprising:
    (a) a base having an upper surface, a forward end positioned laterally adjacent said tube and a rearward end provided with an elastic abutment protruding above said upper surface;
    (b) a generally elongate support having a first end journalled at said forward end of the base and a second end connected to a means for truncating the tube;
    (c) a generally elongate lever having a first end portion journalled to said base at a location behind said forward end and having a rearward extension in contact with said abutment;
    (d) a jack having one end journalled to said second end of said support and another end journalled to a second end portion of said elongate lever.

2. The apparatus in accordance with claim 1, wherein said elastic abutment comprises a spring covered by a cap positioned in a cavity provided in said rearward end of the base.

3. The apparatus in accordance with claim 2, comprising a stop adjustably mounted to said rearward extension adapted to impinge on said upper surface of the base.

4. The apparatus in accordance with claim 3, wherein said lever has a forward extension which is biased agaisnt said upper surface of the base by force generated by said spring being transferred to said rearward extension so as to cause said lever to pivot towards said forward end of the base.

5. The apparatus in accordance with claim 4, wherein said support is provided with a rearward extension adapted to contact a means for verifying the position of said support operably associated with said support.

6. The apparatus in accordance with claim 5, wherein said means for verifying the position of said support includes a switch for controlling movement of said jack.

7. The apparatus in accordance with claim 6, wherein said switch includes a micro-contact.

8. The apparatus in accordance with claim 4, wherein said jack is set for a predetermined pressure so as to cause said support to pivot towards said forward end of the base in such a manner that said means for truncating exerts a constant pressure against said tube.

9. In an apparatus for truncating an elongate tube, a tool comprising:
  (a) means for cutting attached to a support moveably mounted on a base in a position adjacent said tube;
  (b) a jack journalled at one end to a lever pivotally connected to said base for exerting a predetermined pressure in a direction against said support so as to bring said means for cutting into contact with said tube;
  (c) an elastic abutment provided in said base for exerting a lesser predetermined pressure in a direction against said support so as to maintain said means for cutting in contact with said tube until truncating is completed operably associated with said jack; and
  (d) means for verifying the position of said means for cutting operably associated with said support including a switch to control the direction of the predetermined pressure exerted by said jack.

10. In an apparatus for truncating an elongate tube, a tool comprising:
  (a) a base having an upper surface, a forward end positioned laterally adjacent said tube and a rearward end provided with an elastic abutment including a spring covered by a cap positioned in a cavity provided in said rearward end of the base protruding above said upper surface;
  (b) a generally elongate support having a first end journalled at said forward end of the base and a second end connected to a means for truncating the tube, said support being provided with a rearward extension adapted to contact a means for verifying the position of said support operably associated with said support, said means for verifying including a switch having a microcontact for controlling movement of said jack;
  (c) a generally elongate lever having a first end portion journalled to said base at a location behind said forward end and having a rearward extension including a stop adjustably mounted to said rearward extension adapted to impinge on said upper surface of the base in contact with said abutment, said lever having a forward extension which is biased against said upper surface of the base by force generated by said spring being transferred to said rearward extension so as to cause said lever to pivot towards said forward end of the base; and
  (d) a jack having one end journalled to said second end of said support and another end journalled to a second end portion of said elongate lever, said jack being set for a predetermined pressure so as to cause said support to pivot towards said forward end of the base in such a manner that said means for truncating exerts a constant pressure against said tube.

* * * * *

UNITED STATES PATENT AND TRADEMARK OFFICE
CERTIFICATE OF CORRECTION

PATENT NO. : 4,748,880

DATED : June 7, 1988

INVENTOR(S) : Jean-Paul LANGUILLAT

It is certified that error appears in the above-identified patent and that said Letters Patent is hereby corrected as shown below:

Column 2, line 1, "inclues" should be changed to --includes--.

Column 4, line 32, "shows" should be changed to --shown--.

Column 6, line 12, "coutner" should be changed to --counter--.

Column 7, line 1, "agaisnt" should be changed to --against--.

Column 4, line 27, "as" should deleted after "element".

Signed and Sealed this

Third Day of November, 1992

*Attest:*

DOUGLAS B. COMER

*Attesting Officer*     *Acting Commissioner of Patents and Trademarks*